(12) United States Patent
Asai (10) Patent No.: US 9,094,782 B2
(45) Date of Patent: Jul. 28, 2015

(54) INFORMATION-PROCESSING APPARATUS AND COMPUTER-READABLE MEDIUM FOR WIRELESS CONNECTION SETTING

(71) Applicant: Norihiko Asai, Tajimi (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/139,994

(22) Filed: Dec. 24, 2013

(65) Prior Publication Data
US 2014/0176981 A1    Jun. 26, 2014

(30) Foreign Application Priority Data
Dec. 26, 2012  (JP) ................................ 2012-282644

(51) Int. Cl.
| | |
|---|---|
| G06F 3/12 | (2006.01) |
| G06K 15/00 | (2006.01) |
| H04N 1/00 | (2006.01) |
| H04W 4/00 | (2009.01) |
| H04W 76/02 | (2009.01) |

(52) U.S. Cl.
CPC ............. *H04W 4/008* (2013.01); *G06F 3/1204* (2013.01); *G06F 3/126* (2013.01); *G06F 3/1292* (2013.01); *G06K 15/4045* (2013.01); *H04N 1/00204* (2013.01); *H04N 1/00278* (2013.01); *H04W 4/001* (2013.01); *H04W 76/021* (2013.01)

(58) Field of Classification Search
None
See application file for complete search history.

(56) References Cited

U.S. PATENT DOCUMENTS

| | | | | |
|---|---|---|---|---|
| 2006/0221915 | A1* | 10/2006 | Gatta et al. ..................... | 370/338 |
| 2010/0054154 | A1* | 3/2010 | Lambert et al. ............... | 370/254 |
| 2011/0177780 | A1 | 7/2011 | Sato et al. | |
| 2014/0004793 | A1* | 1/2014 | Bandyopadhyay et al. . | 455/41.1 |

FOREIGN PATENT DOCUMENTS

| | | |
|---|---|---|
| JP | H08-300776 A | 11/1996 |
| JP | 2005-349688 A | 12/2005 |
| JP | 2007-166538 A | 6/2007 |
| JP | 2011-146991 A | 7/2011 |

OTHER PUBLICATIONS

Wi-Fi Alliance Technical Committee P2P Task Group, "Wi-Fi Peer-to-Peer (P2P) Technical Specification", Version 1.1, pp. 1-159.

* cited by examiner

*Primary Examiner* — King Poon
*Assistant Examiner* — Vincent Peren
(74) *Attorney, Agent, or Firm* — Banner & Witcoff, Ltd.

(57) ABSTRACT

A non-transitory computer readable medium having computer readable instruction which configures a processor to function as: a first communication unit configured to execute a communication using a first type interface with a communication target device; a second communication unit configured to obtain, by using the first communication unit, identifying information used to execute a communication with the communication target device through a second type interface when a first network in which the communication target device is included is different from a second network set as a communication destination for a communication through the second type interface; a third communication unit configured to execute a communication with the communication target device through the second type interface when the first type network is same as the second type network; and a fourth communication unit configured to execute a restoring process where the communication destination is restored to the second network.

17 Claims, 5 Drawing Sheets

INFORMATION-PROCESSING APPARATUS AND COMPUTER-READABLE MEDIUM FOR WIRELESS CONNECTION SETTING

CROSS-REFERENCE TO RELATED APPLICATION

This application claims priority under 35 U.S.C. §119 from Japanese Patent Application No. 2012-282644, filed on Dec. 26, 2012. The entire subject matter of the application is incorporated herein by reference.

BACKGROUND

1. Technical Field

Aspects of the present invention relate to an information processing apparatus, a method for controlling the information processing apparatus and a computer readable medium for information processing for executing communication with a device.

2. Related Art

Various types of technologies for wireless communication between two communication devices have been proposed. For example, two communication devices execute a short-distance wireless communication for wireless settings in accordance with a wireless communication mode based on NFC (Near Field communication). The wireless settings are used for executing a wireless communication based on a communication mode (e.g., IEEE802.11a or 802.11b) different from NFC. As a result, the two devices become able to execute the wireless communication in accordance with the wireless settings.

SUMMARY

However, there is a case where default wireless settings which have been set in advance on a communication device are changed to new wireless settings due to execution of the short-distance wireless communication. In such a case, if a user plans to execute a wireless communication in accordance with the default wireless settings after completion of execution of a wireless communication in accordance with the new wireless settings, the user needs to make wireless settings again.

Aspects of the present invention are advantageous in that they provide an information processing apparatus, a method for controlling the information processing apparatus and a computer readable medium for information processing capable of solving the above described problem.

According to an aspect of the invention, there is provided a non-transitory computer readable medium having computer readable instruction stored thereon, which, when executed by a processor of an information processing apparatus comprising a first type interface configured to execute a wireless communication with a device in a first communication mode and a second type interface configured to execute a wireless communication with a network or a device in a second communication mode, configures the processor to function as: a first communication unit configured to execute a communication using the first type interface with a communication target device with which the information processing apparatus communicates; a second communication unit configured to obtain, by using the first communication unit, identifying information used to execute a communication with the communication target device through the second type interface and to execute a communication with the communication target device through the second type interface based on the obtained identifying information when a first network in which the communication target device is included is different from a second network set as a communication destination for a communication through the second type interface of the information processing apparatus; a third communication unit configured to execute a communication with the communication target device by executing a communication with the second network through the second type interface when the first type network is same as the second type network; and a fourth communication unit configured to execute a restoring process where the communication destination for a communication through the second type interface is restored to the second network after completion of the communication based on the identifying information by the second communication unit.

According to another aspect of the invention, there is provided an information processing apparatus configured as described above.

According to another aspect of the invention a method for configuring an information processing apparatus to have the above described functional units.

DETAILED DESCRIPTION

Hereafter, an embodiment according to the invention will be described with reference to the accompanying drawings.

(Configuration of Network 10)

Figure 1:
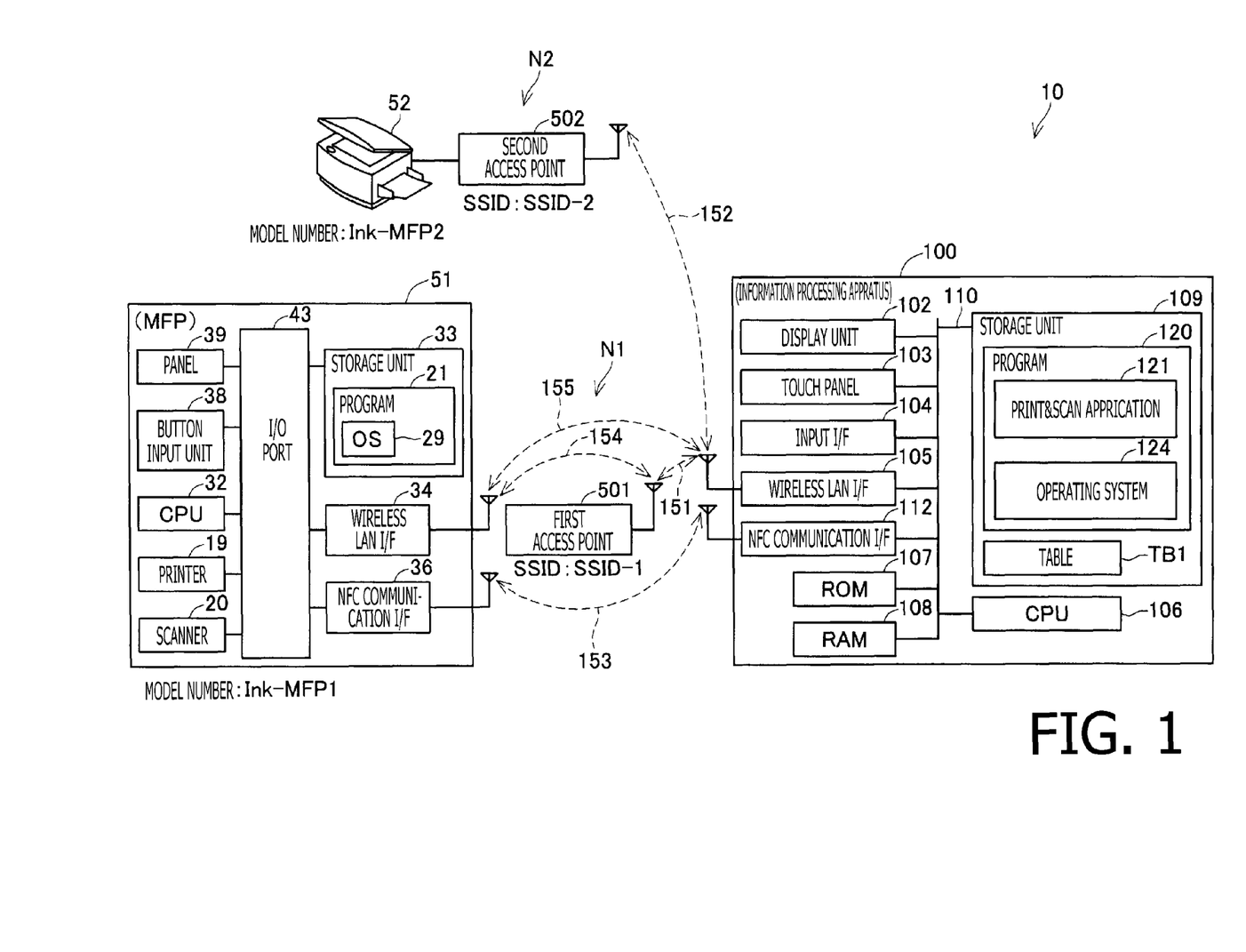
FIG. 1 is a block diagram illustrating a network according to an embodiment.

As shown in FIG. 1, a network 10 includes an information processing apparatus 100, MFPs 51 and 52, a first access point 501 and a second access point 502. The term MFP means a multifunction peripheral having a plurality of functions including a print function, a scanning function and a copying function.

An NFC communication I/F 112 of the information processing apparatus 100 is configured to communicate with an NFC communication I/F 36 of the MFP 51 via a wireless communication 153 of an NFC (Near Field Communication) type. In this embodiment, the wireless communication of the NFC type is based on ISO/IEC21481 or 18092, for example.

A wireless LAN I/F 105 of the information processing apparatus 100 is able to perform an infrastructure mode communication with a wireless LAN I/F 34 of the MFP 51 via wireless communications 151 and 154 based on a wireless LAN. Furthermore, the wireless LAN I/F 105 is able to perform an infrastructure mode communication with the MFP 52 via a wireless communication 152 based on a wireless LAN. The wireless LAN I/F 105 is also able to directly communicate with the wireless LAN I/F 34 via a wireless communication 155 based on WiFi Direct (hereafter, abbreviated as WFD). The information processing apparatus 100 is able to configure a WFD network by establishing a connection with the MFP 51 in accordance with WFD. In WFD, a wireless communication is executed, for example, based on a standard IEEE (The Institute of Electrical and Electronics Engineers, Inc.) 802.11 or a standard (802.11a, 11, 11g, 11n, and etc.) complying with IEEE 802.11.

A network N1 is configured by the first access point 501 and the MFP 51. A network N2 is configured by the second access point 502 and the MFP 52. Each of the first access point N1 and the second access point N2 has an SSID (Service Set Identifier). SSID is a name for indentifying each of the first access point 501 and the second access point 502. The information processing apparatus 100 is able to transmit a print request or a scan request, to the MFPs 51 and 52, via communication using the wireless LAN I/F 105, by executing a print and scan application 121.

(Configuration of Information Processing Apparatus 100)

The information processing apparatus 100 is a portable device, such as a mobile phone or a portable terminal. The information processing apparatus 100 includes a display unit 102, a touch panel 103, an input I/F 104, the wireless LAN I/F 105, the NFC communication I/F 112, a CPU (Central Processing Unit) 106, a ROM (Read Only Memory) 107, a RAM (Random Access Memory) 108 and a storage unit 109. These components are connected with each other via, for example, an input/output port 110.

The display unit 102 receives an image signal outputted by the CPU 106, and displays an image based on the received image signal. As the display unit 102, an LCD or an organic EL panel can be used. The touch panel 103 is formed of a transparent member, and is disposed to cover a surface of the display unit 102. The touch panel 103 detects a position touched, for example, by a user's finger, and outputs information on the detected position to the CPU 106. The input I/F 104 is, for example, an operation button.

The NFC communication I/F 112 is an interface to execute the wireless communication 153 based on NFC. Information for communication setting, such as an IP address and an SSID, is not required to establish the wireless communication 153 based on NFC. The wireless LAN I/F 105 is an interface for executing the wireless communications 151, 152 and 155 based on wireless LAN. The distance within which the wireless communications 151m 152 and 153 based on wireless LAN can be performed is larger than the distance within which the wireless communication 153 based NFC can be performed. In addition, the communication rate of the wireless communications 151, 152 and 155 based on wireless LAN is higher than the communication rate of the wireless communication 153 based NFC.

The CPU 106 executes a program stored in the storage unit 109. The RAM 108 stores temporarily information required for processing for the CPU 106. The storage unit 109 is configured as a combination of a flash memory, an HDD (hard disk drive) and a buffer provided in the CPU 106. The storage unit 109 is able to store data, such as image data and document data. The storage unit 109 stores a program 120. The program 120 includes a print and scan application 121 (hereafter, referred to as an application 121) and an operating system 124 (hereafter, referred to as an OS 124). The CPU 106 executes a process according to the program 120. In the following, frequently the CPU 106 executing a program (e.g., the application 121 or the OS 124) will be simply referred to by a name of the program. For example, there is a case where the wording "the application program 121" means "the CPU 106 executing the application 121".

The application 121 is an application for controlling the CPU 16 to execute processes, such as a process for transmitting a print command from the information processing apparatus 100 to the MFP 51. The OS 124 is a program providing basic functions, and is used commonly by applications, such as the application 121. The OS 124 includes a program for controlling the wireless LAN I/F 105 and the NFC communication I/F 112 to execute wireless communication. The OS 124 also provides an API (Application Programming Interface) for enabling a program to obtain information which various hardware components have acquired or enabling a program to give instructions to various hardware components.

The storage unit 109 stores a table TB1. The table TB1 stores particular device identification information for identifying a particular device and particular network identification information for identifying a particular network. The particular device is a set device selected from a plurality of devices as a communication destination for the information processing apparatus 100. The particular network is a set network as a communication destination for the communication using the wireless LAN I/F 105 of the information processing apparatus 100. A network in which the particular device is included may be set as the particular network.

Figure 4:
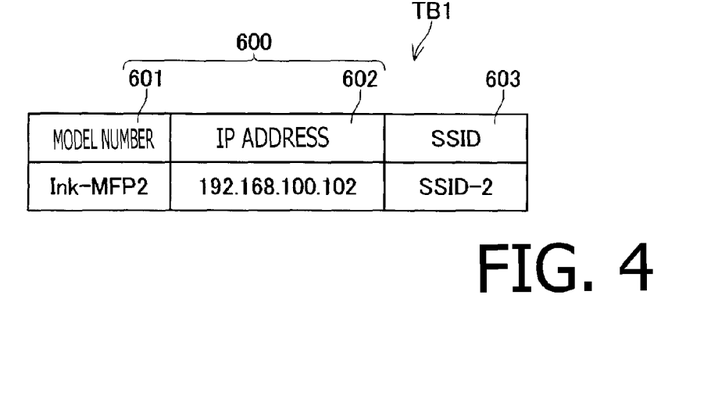
FIG. 4 illustrates an example of a table.

In an example of the table TB1 shown in FIG. 4, a model number 601 and an IP address 602 are used as the particular device identification information. Further, an SSID 603 is used as the particular network identification information. The model number 601 is information for identifying the type of each device. The IP address 602 is a known bit string which is assigned to each device and is used for communication. The SSID 603 is an identifier for identifying an access point constituting the particular network.

In the following, explanation is given regarding the case where the model numbers 601 of the MFPs 51 and 52 are "Ink-MFP1" and "Ink-MFP2", respectively, the ID addresses 602 of the MFPs 501 and 502 are "192.168.100.101" and "192.168.100.102", respectively, the SSID of the first access point 501 constituting the network N1 is "SSID-1", and the SSID of the second access point 502 constituting the network N2 is "SSID-2". As shown in FIG. 4, the table TB 1 stores "Ink-MFP2" as the model number 601, "192.168.100.102" as the IP address 602, and "SSID-2" as the SSID 603. That is, FIG. 4 illustrates the case where the MFP 52 is selected as the particular device, and the network N2 is selected as the particular network.

(Configuration of MFP 51)

Hereafter, the configuration of the MFP 51 is explained. The MFP 51 includes a CPU 32, a storage unit 33, the wireless LAN I/F 34, the NFC communication I/F 36, a button input unit 38, a panel 39, a printer 10 and a scanner 20 as basic components. These components are able to communicate with each other via an input/output port 43.

The CPU 32 executes a program 21 stored in the storage unit 33. The storage unit 33 is configured as a combination of a RAM, a ROM, a flash memory, an HDD (hard disk drive) and a buffer provided in the CPU 32. The storage unit 33 stores the program 21 which includes various programs, such as an OS 29.

The NFC communication I/F 36 is an interface for executing the wireless communication 153 based on NFC. The wireless LAN I/F 34 is an interface for executing the wireless communications 154 and 155 based on wireless LAN. The button input unit 38 is a key for executing the various functions of the MFP 51. The button input unit 38 may be a touch panel provided integrally with the panel 39. The panel 39 displays various types of function information of the MFP 51. The printer 19 executes a printing operation using image data stored in the storage unit 33. The scanner 20 executes a reading operation. Since the MFP 52 has the same configuration as that of the MFP 51, the detailed configuration of the MFP 52 is omitted for the sake of simplicity.

(Operation of Application 121)

Hereafter, a process in which the CPU 106 controls the various units in accordance with the application 121 is explained with reference to FIGS. 2 to 5. In the following, explanation is given for the case where the network N2 is set as the particular network, the information processing apparatus 100 is connected to the network N2 being the particular network, and a user holds the information processing apparatus 100 up over the MFP 51 (i.e., the MFP 51 is selected as a communication target device).

Figure 2:
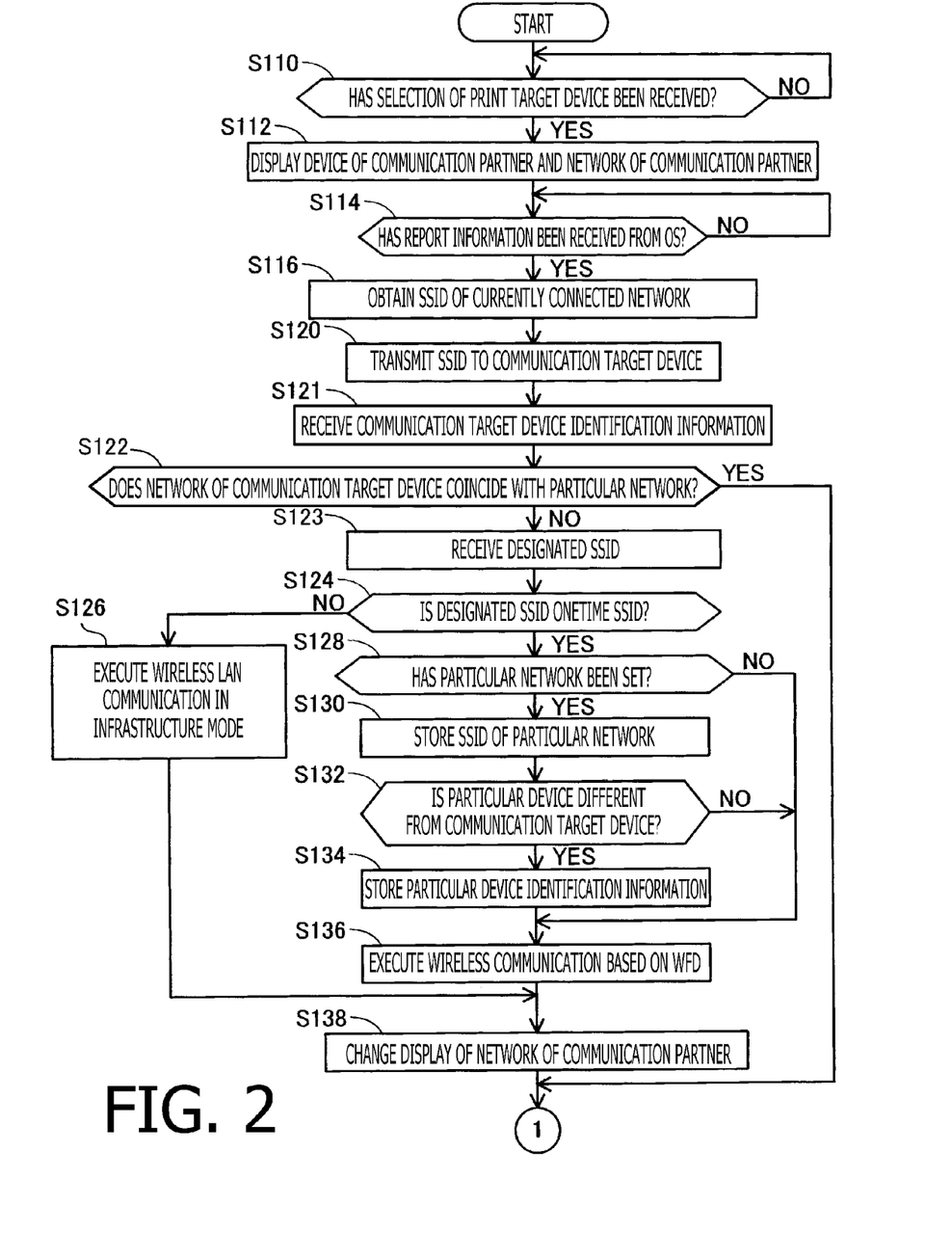
FIG. 2 is a part of a flowchart executed by a CPU to control each component in accordance with an application program.
Figure 5:
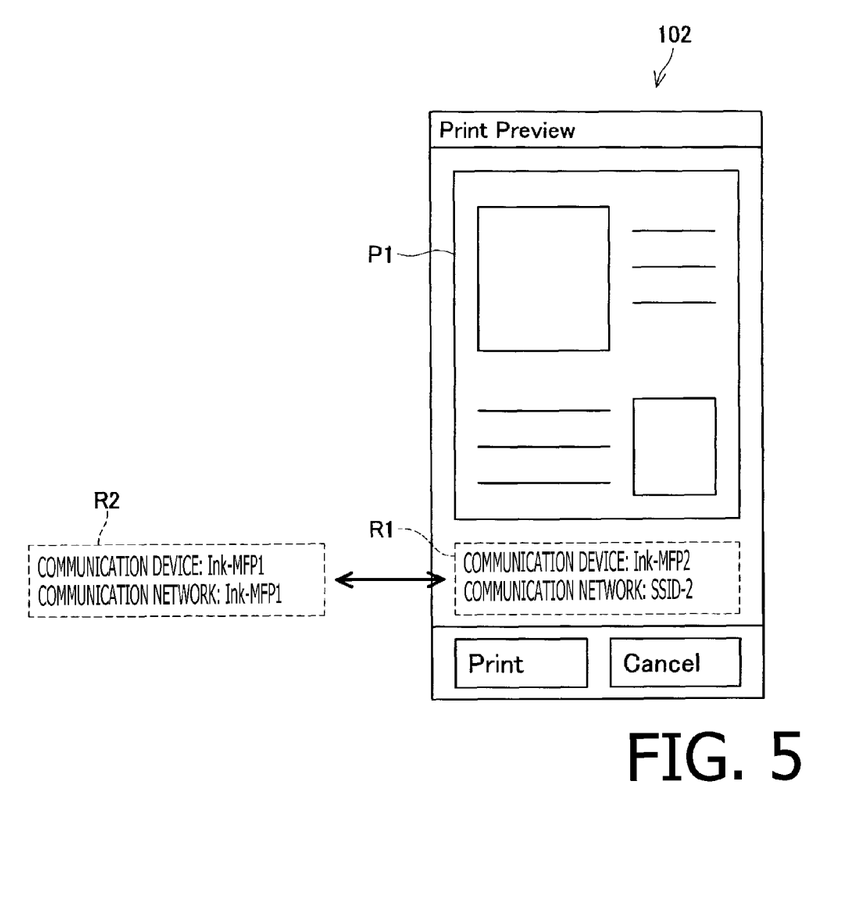
FIG. 5 illustrates an example of onscreen representation on a display unit.

When the application 121 is invoked, a flowchart shown in FIG. 2 is started. In S110, the application 121 judges whether the touch panel 103 has received an operation for selecting print target data. When the print target data has not been received (S110: NO), the process returns to S110. When the print target data has been received (S110: YES), the process proceeds to S112. In S112, the application 121 displays a print preview on the display unit 102. Furthermore, the application 121 displays a device of a communication partner and a network of a communication partner on the display unit 102. In the example of the embodiment, a print preview image P1 is displayed on the display unit as shown in FIG. 5. As illustrated in a region R1 in FIG. 5, the model number of the particular device (i.e., MFP 52) is displayed as information representing the device of the communication partner, and an SSID (i.e., SSID-2) of the second access point 502 included in the particular network (i.e., the network N2) is displayed as information representing the network of the communication partner.

In S114, the application 121 judges whether report information informing start of NFC communication has been received from the OS 124. The NFC communication is started when the NFC communication I/F 112 provided in the information processing apparatus 100 moves into an area within a predetermined distance from an NFC communication I/F provided in a target device of NFC communication. The predetermined distance may be, for example, approximately 10 cm. When the report information has not been received (S114: NO), the process returns to S114. When the report information has been received (S114: YES), the process proceeds to S116. In the example of the embodiment, the explanation is given for the case where the user holds the information processing apparatus 100 up over the MFP 51. The application 121 receives, from the OS 124, the report information representing the fact that the wireless communication 153 based on NFC with the MFP 51 is started.

In S116, the application 121 obtains, from the OS 124, the SSID of the network currently connected with the information processing apparatus 100. In the example according to the embodiment, the information processing apparatus 100 is connected with the network N2 being the particular network. Therefore, the SSID (i.e., SSID-2) of the second access point 502 included in the network N2 is obtained.

In S120, the application 121 transmits the obtained SSID to the communication target device using the wireless communication 153 based on NFC. In the example according to the embodiment, the SSID-2 of the second access point 502 is transmitted to the MFP 51 being the communication target device. In S121, the application 121 receives the of communication target device identification information from the communication target device, through the wireless communication based on NFC. The communication target device identification information is, for example, a model number of a communication target device, an IP address of a communication target device, an SSID of a network in which a communication target device is included and a password of the SSID. The application 121 may receive, from the communication target device, coincidence judgment information which is described later. In the example according to the embodiment, the application 121 receives the model number (Ink-MFP1) and the IP address (192.168.100.101) of the MFP 51 being the communication target device, the SSID (SSID-1) of the network N1, and etc.

In S122, the application 121 judges whether the network in which the communication target device is included coincides with the particular network (i.e., the network with which the information processing apparatus 100 is being connected). The judgment may be made, for example, based on the coincidence judgment information received from the communication target device in S121. The coincidence judgment information indicates whether the network in which the communication target device is included coincides with the particular network. The coincidence judgment information is generated by the communication target device. For example, the communication target device may generate the coincidence judgment information indicating that the both networks coincide with each other when the SSID of the particular network (this SSID is transmitted to the communication target device in S120) coincides with the SSID of the network (this SSID is stored, for example, in a storage unit of the communication target device) to which the communication target device belongs.

When the both networks coincide with each other (S122: YES), it can be judged that the information processing apparatus 100 is able to communicate with the communication target device via the particular network. Therefore, since in this case there is no necessity to establish a new communication path, the process proceeds to S139. On the other hand, when the both networks do not coincide with each other (S122: NO), the process proceeds to S123.

In S123, the application 121 receives a designated SSID from the communication target device via the wireless communication 153 based on NFC. The designated SSID is an SSID designated by the communication target device. The designated SSID is used for executing the communication with the communication target device using the wireless LAN I/F 105.

In S124, the application 121 judges whether the designated SSID received from the communication target device is a onetime SSID. The one-time SSID is an SSID having a character string which is provided as a different character string at each issuance. The SSID is also an SSID for executing wireless communication based on WFD. As an example of a method for judging whether the designated SSID is a onetime SSID, a method of judging whether a predetermined character string indicating a onetime SSID is contained in the character string of the designated SSID can be cited. As an example of the predetermined character string, a character string "onetime" can be cited.

When the designated SSID is not a onetime SSID (S124: NO), it can be judged that the communication target has designated the wireless LAN communication of the infrastructure mode via an access point. Therefore, in this case, the process proceeds to S126 where the wireless LAN communication in the infrastructure mode is executed based on the received designated SSID.

On the other hand, when the designated SSID is a onetime SSID in S124 (S124: YES), it can be judged that the communication target device has designated a wireless communication based on WFD, and the process proceeds to S128. In S128, the application 121 judges whether the particular network has been set. This judgment may be made by confirming whether the SSID 603 is stored in the table TB1. When the particular network has not been set (S128: NO), the process proceeds to S136. When the particular network has been set (S128: YES), the process proceeds to S130. In S130, the application 121 stores temporarily the SSID 603 of the particular network in the RAM 108. In the explanation of the embodiment, the SSID (i.e., SSID-2) of the network N2 is stored in the RAM 108 temporarily.

In S132, the application 121 judges whether the particular device is different from the communication target device. This judgment may be made by checking whether particular device identification information 600 coincides with the communication target device identification information received in S121. When the particular device coincides with the communication target device (S132: NO), the process proceeds to S136. When the particular device does not coincide with the communication target device (S132: YES), the process proceeds to S134. In S134, the application 121 temporarily stores the particular device identification information in the RAM 108.

In S136, the application 121 executes communication with the communication target device based on the WFD wireless communication. Specifically, the application 121 executes the WFD wireless communication with the communication target device by providing the onetime SSID received in S123 with the OS 124. In the example of the embodiment, the wireless communication 155 based on WFD is executed with the MFP 51 being the communication target device.

In S138, the application 121 changes display of the network of the communication partner. In the example of the embodiment, representation shown in a region R2 in FIG. 5 is displayed in the region R1 in place of the representation being currently displayed in the region R1 in FIG. 5. As a result, display of the network of the communication partner is changed to the model number of the communication target device (i.e., MFP 51).

In S139, the application 121 judges whether the particular device is different from the communication target device. Since the judging manner in S139 is the same as that in S132 described above, explanation of S139 is omitted. When the particular device coincides with the communication target device (S139: NO), the process proceeds to S150. When the particular device is different from the communication target device (S139: YES), the process proceeds to S140. In S140, the application 121 changes the representation of the device of the communication partner. In the example of the embodiment, representation shown in the region R2 in FIG. 5 is displayed in the region R1 in place of the representation being currently displayed in the region R1 in FIG. 5. As a result, the representation of the device of the communication partner is changed to the model number of the communication target device (i.e., the MFP 51). Thus, it is possible to display the information indicating the communication target device on the display unit 102 during the communication with the communication target device using the wireless LAN I/F.

Figure 3:
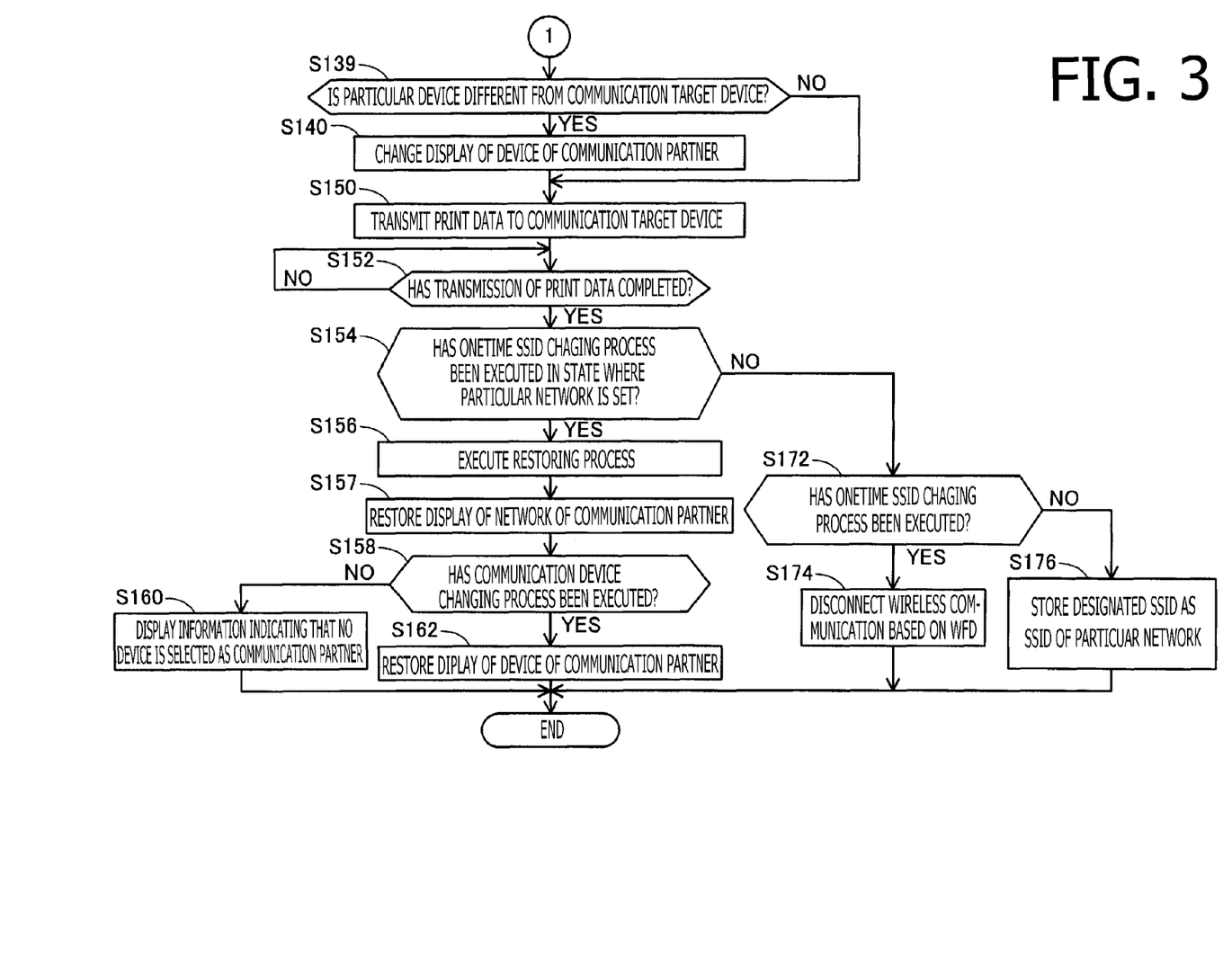
FIG. 3 is a part of the flowchart executed by the CPU to control each component in accordance with the application program.

In S150, the application 151 transmits the print data to the communication target device by using the wireless LAN I/F 105. Since the communication using the wireless LAN I/F 105 is faster than the communication using the NFC communication I/F 112, the print data can be transmitted in a shorter period of time. In S152, the application 121 judges whether transmission of the print data has completed. When the transmission of the print data has not completed (S152: NO), the process returns to S152. When the transmission of the print data has completed (S152: YES), the process proceeds to S154.

In S154, the application 121 judges whether a onetime SSID changing process has been executed in the state where the particular network is set. The onetime SSID changing process is a process where a SSID used for executing the communication using the wireless LAN I/F 105 is changed from the SSID of the particular network to the onetime SSID. This judgment may be made by checking whether the SSID of the particular network is temporarily stored in the RAM 108 (i.e., whether the process of S130 has been executed). When the onetime SSID changing process has been executed in the state where the particular network is set (S154: YES), the process proceeds to S156.

In S156, the application 121 executes a restoring process. The restoring process is a process where the communication destination of the wireless communication using the wireless LAN I/F 105 is restored, from the network in which the communication target device is included, to the particular network. Specifically, the application 121 restores the communication destination of the wireless communication using the wireless LAN I/F 105 to the particular network, by providing the SSID of the particular network stored temporarily in the RAM 108 with the OS 124. In the example of the embodiment, the wireless communication executed through the wireless LAN I/F 105 is restored from the wireless communication 155 to the wireless communication 152. As a result, the communication destination of the wireless LAN I/F 105 is restored, from the network (i.e., the network communication with the MFP 51 without intervention of the first access point 501) in which the communication target device (i.e., the MFP 51) is included, to the particular network (i.e., the network N2).

In S157, the application 121 executes a process for restoring display of the communication destination network to the original representation. In the example of the embodiment, the SSID (i.e., SSID-2) of the second access point 502 included in the particular network (i.e., the network N2) is displayed as the information indicating the communication destination network, as shown in the region R1 in FIG. 5.

In S158, the application 121 judges whether a communication device changing process has been executed. The communication device changing process is a process for changing a device of a communication target from the particular device to the communication target device. This judgment may be made by checking whether the particular device identification information 600 is temporarily stored in the RAM 108 (i.e., whether the process of the S134 has been executed). When the communication device changing process has been executed (S158: YES), the process proceeds to S162. In S162, the application 121 executes a process for restoring representation of the device of the communication partner to the original representation. In the example of the embodiment, the model number of the particular device (i.e., the MFP 52) is displayed as the information indicating the device of the communication partner as shown in the region R1 in FIG. 5.

On the other hand, when the communication device changing process has not been executed (S158: NO), the process proceeds to S160. In S160, the application 121 displays information indicating that no device is selected as a communication partner in the display unit 102. Then, the flowchart terminates.

On the other hand, when it is judged in S154 that the onetime SSID changing process has not been executed in the state where the particular network is set (S15: NO), the process proceeds to S172. In S172, the application 121 judges whether the onetime SSID changing process has been executed. This judgment may be made by checking whether the designated SSID received from the communication target is a onetime SSID (i.e., the judgment result in S124).

When the onetime SSID changing process has been executed (S172: YES), the process proceeds to S174 where the wireless communication based on WFD is disconnected. When the onetime SSID changing process has not been executed (S172: NO), it is judged that the designated SSID received from the communication target is an SSID for wireless communication in the infrastructure mode, and the process proceeds to S176. In S176, the application 121 stores the designated SSID in the table TB1 as the SSID 603 of the particular network. Then, the flowchart terminates.

(Advantageous Effect)

Advantageous effects of the above described application 121 will now be explained. When the particular network (e.g., the network N2) set as a communication destination for communication using the wireless LAN I/F 105 is different from the network (e.g., the MFP 51) in which the communication target device is included (S122: NO), the application 121 is able to receive the designated SSID from the communication target device via the wireless communication 153 based on NFC (S123). Then, the application 121 is able to execute communication (e.g., the wireless communication 155) with the communication target device (e.g., the MFP 151), using the wireless LAN I/F 105, based on the obtained designated SSID. After the communication with the communication target device is finished (S152: YES), the communication destination for the communication using the wireless LAN I/F 105 can be automatically restored from the network (e.g., the MFP 51), in which the communication target device is included, to the particular network (e.g., the network N2) (S156). Therefore, it is unnecessary for the user to make settings regarding a communication destination for communication using the wireless LAN I/F 105 even when the communication with the particular network (e.g., the network N2) using the wireless LAN I/F 105 is started after the communication with the communication target device using the wireless LAN I/F 105 is finished. As a result, usability can be enhanced.

When the designated SSID is a onetime SSID (S124: YES), a communication path (e.g., the wireless communication 155) established with the communication target device (e.g., the MFP 51) using the wireless LAN I/F 105 based on the designated SSID has a high possibility of becoming unavailable after completion of the communication. Since the application 121 automatically restores the communication destination for communication using the wireless LAN I/F 105 to the particular network (e.g., the network N2) (S156) after the communication with the communication target device is finished (S152: YES), it becomes possible to avoid occurrence of a situation where the user continues using a communication having a high possibility of becoming unavailable later.

The application 121 is able to judge whether the network in which the communication target device is included coincides with the particular network based on the coincidence judgment information received from the communication target device (S122). Therefore, it is possible to cause the communication target device to make judgment on whether the network in which the communication target device is included coincides with the particular network. As a result, it becomes possible to decrease the processing load on the information processing apparatus 100.

The application 121 is able to change representation of a network of a communication partner or representation of a device of a communication partner (S138, S140) in response to connection with a network which is different from the particular network (S136). Furthermore, the application 121 is able to restore the representation of the network of the communication partner or the representation of the device of the communication partner to original representation (S157, S162) in response to restoring of the communication destination to the particular network (S156). Therefore, it is possible to indicate a communication target of the information processing apparatus 100 in real time. As a result, usability can be enhanced.

When the particular network is not set (S128: NO) and the designated SSID received from the communication target device is not a onetime SSID (S172: NO), the designated SSID can be stored in the table TB1 as the SSID 603 of the particular network (S176). Therefore, it becomes possible to automatically set the particular network when the particular network is not set. As a result, it becomes possible to save the user selecting the particular device and making settings.

The application 121 is able to detect completion of the communication using the wireless LAN I/F 105 by detecting completion of the communication for image data (S152: YES). Therefore, it is possible to eliminate the need for communicating with the communication target device for the information for making a judgment on the completion of the communication using the wireless LAN I.F 105. As a result, it becomes possible to suppress traffic of the communication.

The application 121 executes the wireless communication based on WFD using the wireless LAN I/F 105, with the communication target device, by providing the onetime SSID received from the communication target device with the OS 124 (S136). Furthermore, the application 121 restores the communication destination of the wireless communication using the wireless LAN I/F 105 to the particular network (S156), by providing the SSID temporarily stored in the RAM 108 with the OS 124. Therefore, it becomes possible to cause the OS 124 to execute the process for executing the communication. As a result, it becomes possible to suppress the process amount executed by the application 121 or to suppress the size of the application 121.

Although the present invention has been described in considerable detail with reference to certain preferred embodiments thereof, the scope of the invention is not limited to the above described embodiments. Various variations and modifications of the above described embodiments are also included in the scope of the invention. Such variations are explained below.

(Variations)

Figure 6:
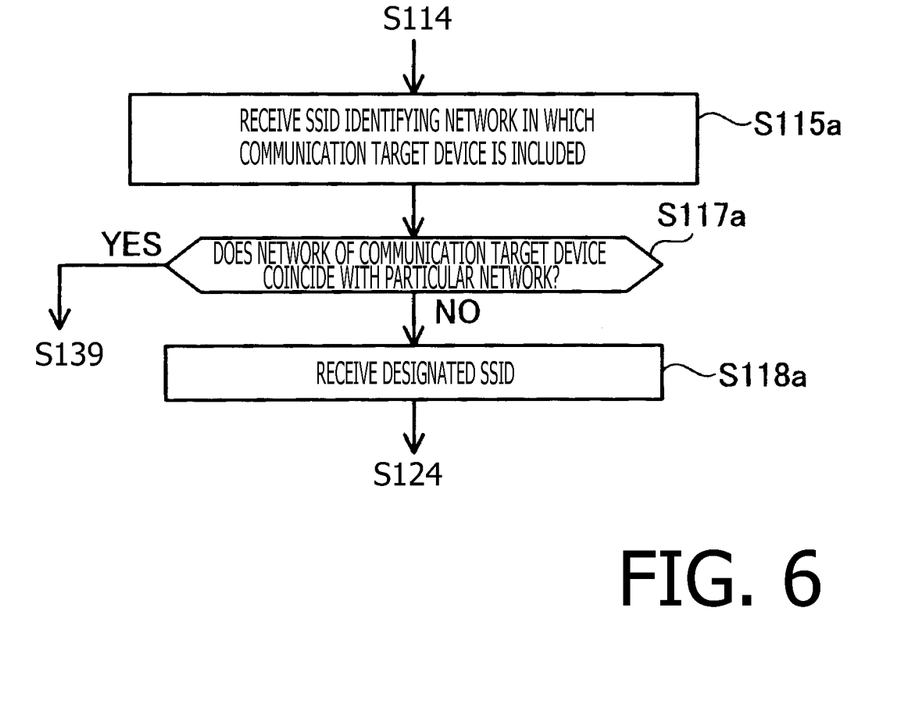
FIG. 6 is a variation of a flowchart executed by a CPU to control each component in accordance with an application program.

The judgment on whether the network in which the communication target device is included coincides with the particular network is not limited to the above described example. In FIG. 6, a part of a flowchart where the coincidence judgment is executed by the application 121 is shown. When the report information is received from the OS 124 (S114: YES), the process proceeds to S115a. In S115a, the application 121 receives, from the communication target device, the SSID identifying the network in which the communication target device is included. In the example of the embodiment, the SSID of the network N1 (i.e., SSID-1) in which the MFP 51 being the communication target device is included is received. In S117a, the application 121 judges whether the network in which the communication target device is included coincides with the particular network. This judgment may be made by checking whether the SSID of the particular network (read out from the table TB1) coincides with the SSID (obtained in S115a) of the network to which the communication target deice belongs. When the network in which the communication target device is included coincides with the particular network (S117a: YES), the process proceeds to S139. When the network in which the communication target device is included does not coincide with the particular network (S117a: NO), the process proceeds to S118a. In S118a, the application 121 receives the designated SSID from the communication target device via the wireless communication 153 based on NFC. As a result, it becomes possible to cause the application 121 to make the judgment.

The judgment on whether the communication with the communication target device is finished is not limited to the example where whether the transmission of the print data is finished is monitored in S152. For example, completion of the communication may be detected in response to receipt of communication completion report information indicating completion of the communication with the communication target device, from the communication target device, through the communication using the wireless LAN I/F 105. As a result, completion of the communication with the communication target device using the wireless LAN I/F 105 can be detected securely.

The timing at which the application 121 receives the SSID of the network with which the information processing apparatus 100 is being connected is not limited to the timing of S116. For example, the SSID may be received at the timing at which the print preview is presented or at the timing at which the application 121 is started.

The process of S122 or S124 may be omitted. In this case, the designated SSID is constantly treated as a onetime SSID. Therefore, as communication with the communication target device, the wireless communication based on WFD is used constantly.

In the above described embodiment, explanations are made for the case where the user holds the information processing apparatus 100 up and selects, as the communication target device, the device which has executed the NFC communication to cause the communication target device to execute the print process. When the print process is executed using the NFC communication, the information enabling the user to recognize the communication using the NFC communication may be displayed on the display unit 102. For example, a character string indicating that the printing is being executed by the device over which the information processing apparatus 100 is held up.

The values of the IP address and the character strings of the SSID in the above described embodiment are used by way of example, and various values and character strings may be used as the IP address and the SSID.

The communication between the first access point 501 and the MFP 51 and the communication between the second access point 502 and the MFP 52 may be either of wireless communication or wire communication.

The representation on the display unit 102 shown in FIG. 5 is merely an example. Various types of images may be displayed on the display unit 102.

Various types of data may be used as the model number 601 as long as such data uniquely define a device. For example, data not including numbers or data formed only of symbols may be used as the model number. Alternatively, a name (e.g., a device name) uniquely defining a device may be used as the model number.

The information identifying a device is not limited to the IP address, and a URL or a MAC address may be used as the information identifying a device.

The information processing apparatus 100 may be configured such that an external memory, such as a memory card, can be connected thereto. In this case, various types of data may be stored in the external memory in place of the storage unit 109.

Each program may be formed as one program module or may be formed of a plurality of program modules. Each component or program module may be replaced with another one within the scope of the invention. The invention may be implemented on a computer (e.g., the CPU 106) executing an image processing program (e.g., the application 121), a computer executing a process (e.g., an operating system or another application) other than the image processing program, a hardware unit operating in accordance with a program, or a combination of a computer and a hardware component. The invention may also be implemented on a computer executing processes of a plurality of programs in conjunction with each other or a hardware component operating in accordance with instructions from such a computer.

It is noted that various connections are set forth between elements in the foregoing description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

What is claimed is:

1. A non-transitory computer readable medium having computer readable instructions stored thereon, which, when executed by a processor of an information processing apparatus comprising a first type interface configured to execute a wireless communication with a device in a first communication mode, a second type interface configured to execute a wireless communication with a network or a device in a second communication mode, a storage unit that stores particular device-identification information identifying a particular device that has been selected in advance from a plurality of devices as a communication destination of the information processing apparatus, and a display unit, configures the processor to function as:

a first communication unit configured to execute a communication using the first type interface with a communication target device with which the information processing apparatus communicates, and to obtain communication target device-identification information identifying the communication target device included in a first network, from the communication target device, through the communication using the first type interface;

a second communication unit configured to obtain, by using the first communication unit, identifying information used to execute a communication with the communication target device through the second type interface and to execute a communication with the communication target device through the second type interface based on the identifying information when the first network in which the communication target device is included is different from a second network set as a communication destination for a communication through the second type interface of the information processing apparatus;

a third communication unit configured to execute a communication with the communication target device by executing a communication with the second network through the second type interface when the first network is same as the second network;

a fourth communication unit configured to execute a restoring process where the communication destination for a communication through the second type interface is restored to the second network after completion of the communication based on the identifying information by the second communication unit; and a display control unit configured to display the communication target device identification information on the display unit during a time period in which the communication with the communication target device is executed through the second communication unit and to display the particular device identification information on the display unit in response to completion of the communication through the second communication unit when the particular device is different from the communication target device.

2. The non-transitory computer readable medium according to claim 1, wherein the instruction further configures the processor such that:

the fourth communication unit executes the restoring process when the identifying information has a character string that is issued as a different character string at every issuance of the character string.

3. The non-transitory computer readable medium according to claim 2, wherein the instruction further configures the processor such that:

the second communication unit judges whether the identifying information includes a character string that is issued as a different character string at every issuance of the character string by detecting whether the identifying information obtained through the first communication unit includes a predetermined character string that has been set in advance.

4. The non-transitory computer readable medium according to claim 1, wherein the instruction further configures the processor such that:

the first communication unit further transmits second identification information identifying the second network to the communication target device through the communication using the first communication unit; and the second communication unit judges that the first network is different from the second network in response to receiving information indicating that the first network is different from the second network, from the communication target device through the first type interface.

5. The non-transitory computer readable medium according to claim 4, wherein the instruction further configures the processor such that:

the first communication unit further obtains third identification information identifying the first network from the communication target device; and the second communication unit judges that the first network is different from the second network when the third identification information is different from the second identification information identifying the second network.

6. The non-transitory computer readable medium according to claim 5, wherein the instruction further configures the processor such that:

the first communication unit obtains the identifying information from the communication target device via the first type interface when the third identification information is different from the second identification information; and the identifying information is issued as a different character string at every issuance of the identifying information.

7. The non-transitory computer readable medium according to claim 1, wherein the instruction further configures the processor such that:

the second communication unit causes display of information indicating execution of the communication with the communication target device on a display unit of the information processing apparatus in response to execution of the communication with the communication target device through the second type interface based on the identifying information; and the fourth communication unit causes display of information indicating execution of the communication with the second network in response to execution of the restoring process.

8. The non-transitory computer readable medium according to claim 1, wherein the information processing apparatus further comprises a storage unit which stores second identification information identifying the second network in response to a fact that the second network is set as a communication destination of the communication through the second type interface of the information processing apparatus, and wherein the instruction further configures the processor such that when the storage unit does not store the second identification information and the identifying information is obtained by the first communication unit, the second communication unit stores the identifying information in the storage unit as the second identification information.

9. The non-transitory computer readable medium according to claim 1, wherein the instruction further configures the processor such that:

the second communication unit executes the communication with the communication target device for image data to be used for image processing; and the fourth communication unit detects completion of the communication through the second communication unit in response to completion of the communication for the image data.

10. The non-transitory computer readable medium according to claim 1, wherein the instruction further configures the processor such that the fourth communication unit detects completion of the communication through the second communication unit in response to receipt of report information, indicating completion of the communication with the communication target device, from the communication target device through communication using the second type interface.

11. The non-transitory computer readable medium according to claim 1, wherein the information processing apparatus further comprises a storage unit storing the instruction and an operating system program, wherein the operating system program, when executed by the processor of the information processing apparatus, configures the processer to function as a communication control unit configured to execute a communication with a network identified by identification information, wherein the instruction further configures the processor such that:

the second communication unit causes the communication control unit to execute a communication with the communication target device through the second type interface by providing the identifying information obtained through the first communication unit with the communication control unit; and the fourth communication unit causes the communication control unit to execute a communication with the second network through the second type interface by providing second identification information identifying the second network with the communication control unit.

12. The non-transitory computer readable medium according to claim 1,
wherein:
the first type interface is an interface for a short-distance wireless communication;
the second type interface is an interface for a wireless LAN communication; and
the identifying information includes a service set identifier (SSID).

13. The non-transitory computer readable medium according to claim 1,
wherein the instruction further configures the processor such that:
the second communication unit executes direct communication with the communication target device through the second type interface when the first network is different from the second network.

14. The non-transitory computer readable medium according to claim 1,
wherein the instruction further configures the processor such that:
the second communication unit executes the communication with the communication target device by communicating with the first network through the second type interface when the first network is different from the second network.

15. An information processing apparatus, comprising:
a storage unit that stores particular device-identification information identifying a particular device that has been selected in advance from a plurality of devices as a communication destination of the information processing apparatus;
a display unit
a first type interface configured to execute a wireless communication with a device in a first communication mode;
a second type interface configured to execute a wireless communication with a network or a device in a second communication mode;
a first communication unit configured to execute a communication using the first type interface with a communication target device of the information processing apparatus, and to obtain communication target device-identification information identifying the communication target device included in a first network, from the communication target device, through the communication using the first type interface;
a second communication unit configured to obtain, by using the first communication unit, identifying information used to execute a communication with the communication target device through the second type interface and to execute a communication with the communication target device through the second type interface based on the identifying information when the first network in which the communication target device is included is different from a second network set as a communication destination for a communication through the second type interface of the information processing apparatus;

a third communication unit configured to execute a communication with the communication target device by executing a communication with the second network through the second type interface when the first network is same as the second network;

a fourth communication unit configured to execute a restoring process where the communication destination for a communication through the second type interface is restored to the second network after completion of the communication based on the identifying information by the second communication unit; and a display control unit configured to display the communication target device identification information on the display unit during a time period in which the communication with the communication target device is executed through the second communication unit and to display the particular device identification information on the display unit in response to completion of the communication through the second communication unit when the particular device is different from the communication target device.

16. A non-transitory computer readable medium having computer readable instructions stored thereon, which, when executed by a processor of an information processing apparatus comprising a first type interface configured to execute a wireless communication with a device in a first communication mode and a second type interface configured to execute a wireless communication with a network or a device in a second communication mode, configures the processor to function as:
a first communication unit configured to execute a communication using the first type interface with a communication target device with which the information processing apparatus communicates;
a second communication unit configured to:
obtain, by using the first communication unit, identifying information used to execute a communication with the communication target device through the second type interface,
execute a communication with the communication target device through the second type interface based on the identifying information when a first network in which the communication target device is included is different from a second network set as a communication destination for a communication through the second type interface of the information processing apparatus, and
cause display of information indicating execution of the communication with the communication target device on a display unit of the information processing apparatus in response to the execution of the communication with the communication target device through the second type interface based on the identifying information;
a third communication unit configured to execute a communication with the communication target device by executing a communication with the second network through the second type interface when the first network is same as the second network; and
a fourth communication unit configured to:
execute a restoring process where the communication destination for a communication through the second type interface is restored to the second network after completion of the communication based on the identifying information by the second communication unit, and cause display of information indicating execution of the communication with the second network in response to execution of the restoring process.

17. An information processing apparatus, comprising:

a first type interface configured to execute a wireless communication with a device in a first communication mode;

a second type interface configured to execute a wireless communication with a network or a device in a second communication mode;

a first communication unit configured to execute a communication using the first type interface with a communication target device of the information processing apparatus;

a second communication unit configured to:

obtain, by using the first communication unit, identifying information used to execute a communication with the communication target device through the second type interface, execute a communication with the communication target device through the second type interface based on the identifying information when a first network in which the communication target device is included is different from a second network set as a communication destination for a communication through the second type interface of the information processing apparatus, and cause display of information indicating execution of the communication with the communication target device on a display unit of the information processing apparatus in response to execution of the communication with the communication target device through the second type interface based on the identifying information;

a third communication unit configured to execute a communication with the communication target device by executing a communication with the second network through the second type interface when the first network is same as the second network; and a fourth communication unit configured to:

execute a restoring process where the communication destination for a communication through the second type interface is restored to the second network after completion of the communication based on the identifying information by the second communication unit, and cause display of information indicating execution of the communication with the second network in response to execution of the restoring process.

* * * * *